Dec. 16, 1969     E. P. WALKER     3,483,751
DEVICE FOR DETERMINING THE TEMPERATURE OF ELECTRICAL APPARATUS
Filed July 26, 1967     3 Sheets-Sheet 1

INVENTOR
Edward Piper Walker
BY
    Misegades & Douglas
        ATTORNEYS

United States Patent Office 3,483,751
Patented Dec. 16, 1969

3,473,751
DEVICE FOR DETERMINING THE TEMPERATURE OF ELECTRICAL APPARATUS
Edward Piper Walker, Stafford, England, assignor to The English Electric Company Limited, London, England, a British company
Filed July 26, 1967, Ser. No. 656,149
Claims priority, application Great Britain, July 26, 1966, 33,644/66
Int. Cl. G01k 5/18, 5/52, 1/08
U.S. Cl. 73—362
9 Claims

ABSTRACT OF THE DISCLOSURE

A device for determining the temperature of electrical apparatus, e.g. transformer windings, and comprises a temperature-sensitive element which is connected to a source of supply and mounted in a resinous block. Heater windings are mounted around the element and are arranged to conduct current proportional to that conducted by the apparatus, these heater windings being so disposed as to cause the temperature-time characteristic curve of the element to match that of the apparatus. Thus, by monitoring the voltage developed across the element the temperature of, for example, the transformer windings may be determined.

---

This invention relates to a device for determining the temperature of electrical apparatus and particularly, but not necessarily exclusively, determines the temperature of transformer windings.

From one aspect the present invention consists in a device for determining the temperature of electrical apparatus, comprising an electrically conductive temperature-sensitive element adapted to be connected to a source of supply, electrical heater windings mounted in close proximity to said element and arranged to conduct current proportional to that conducted by said apparatus, said heater windings being so disposed relatively to the element as to cause the temperature-time characteristic curve of the element to match that of the said apparatus, and circuit means operable in dependence on the voltage developed across the element for determining the temperature of said apparatus.

The heater windings may comprise two separate coils in order to derive the required temperature-time characteristic curve, a small coil being spaced from but wound closely around the temperature-sensitive element and a larger coil being wound about the small coil and spaced from both this coil and the element.

By employing a device according to this invention there is a negligible heat loss compared with previous types of temperature sensors, e.g. vapour thermometers, and accordingly any deviation of the indicated temperature of the apparatus from its actual temperature is greatly reduced, and the sensitivity of the device is increased.

In the case in which the apparatus, the temperature of which is being determined, is a transformer, the device may conveniently be located in a pocket formed in the top oil, i.e. the hottest part, of the transformer.

The element may be located in a bridge circuit including a balance detector which is calibrated to give an indication of the temperature of any "hot spot" in the transformer, and the voltage across this element may be monitored and utilised to operate cooler control, alarm and trip functions, in that order, with increasing temperature.

In addition, the monitored voltage may additionally or alternatively be employed to indicate the times during which the temperature of the transformer has been in various temperature bands over, for example, a number of years, this feature being useful in assessing whether the transformer rating could be increased in a controlled manner.

In order that the invention can be fully understood, some embodiments thereof will now be described with reference to the accompanying drawings, in which.

Figure 1:
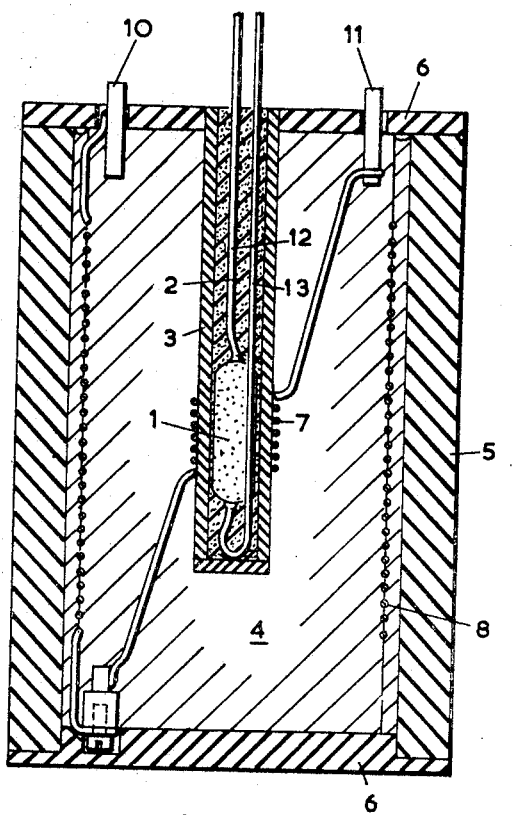
FIGURE 1 illustrates the construction of a "heat sink" incorporating the sensing element.

Referring now to FIGURE 1 in the drawings, the heat sink, which produces a "thermal image" of the transformer winding comprises a silistor 1 (temperature sensing device) encapsulated in silicone rubber 2 housed within a fibreglass tube 3. In turn, the tube is encapsulated in a cylindrical block 4 of epoxy resin which is surrounded by a sealed thermosetting resin coated paper housing comprising a tubular body 5 and two end plates 6. An epoxy resin filler is disposed between the block 4 and the tubular body 5.

The silistor 1 has a positive temperature coefficient of resistance and is embraced by a first heater winding 7 which, in turn, is connected in series with a second heater winding 8 of higher resistance wound in a spiral groove extending over the circumference of the resin block 4.

The heat sink is mounted in the vicinity of the top oil of the transformer, and the heater windings are fed with a predetermined proportion of the transformer load current through terminals 10, 11, the output from the silistor being taken through leads 12, 13 to a control circuit described below with reference to FIGURE 3.

Figure 2:
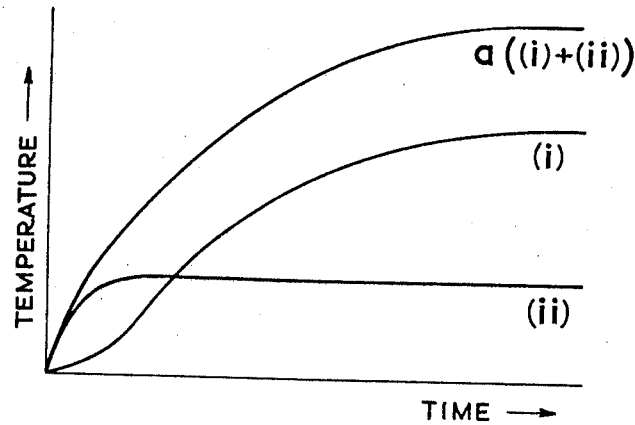
FIGURE 2 is a graph of the temperature-time characteristic curves of both the heater windings and the apparatus.

The two heater windings and the relative dimensions of the heat sink are designed so that the temperature-time characteristic curve of the heat sink accurately matches that required, as shown in FIGURE 2. More particularly, with only the heater winding 8 operating, the temperature-time characteristic curve (i) is obtained which accurately follows the contour of the characteristic curve "a" of the actual transformer windings except for the initial stages in which a time lag is evident before the silistor is influenced by the heat from this winding. However, with the arrangement described, this error is compensated by the small heater winding 7 which, when operating alone, exhibits the temperature-time characteristic curve (ii). Together, the effect of these two windings 7 and 8 is additive to produce the curve (i)+(ii) which accurately matches the required curve "a".

Figure 3:
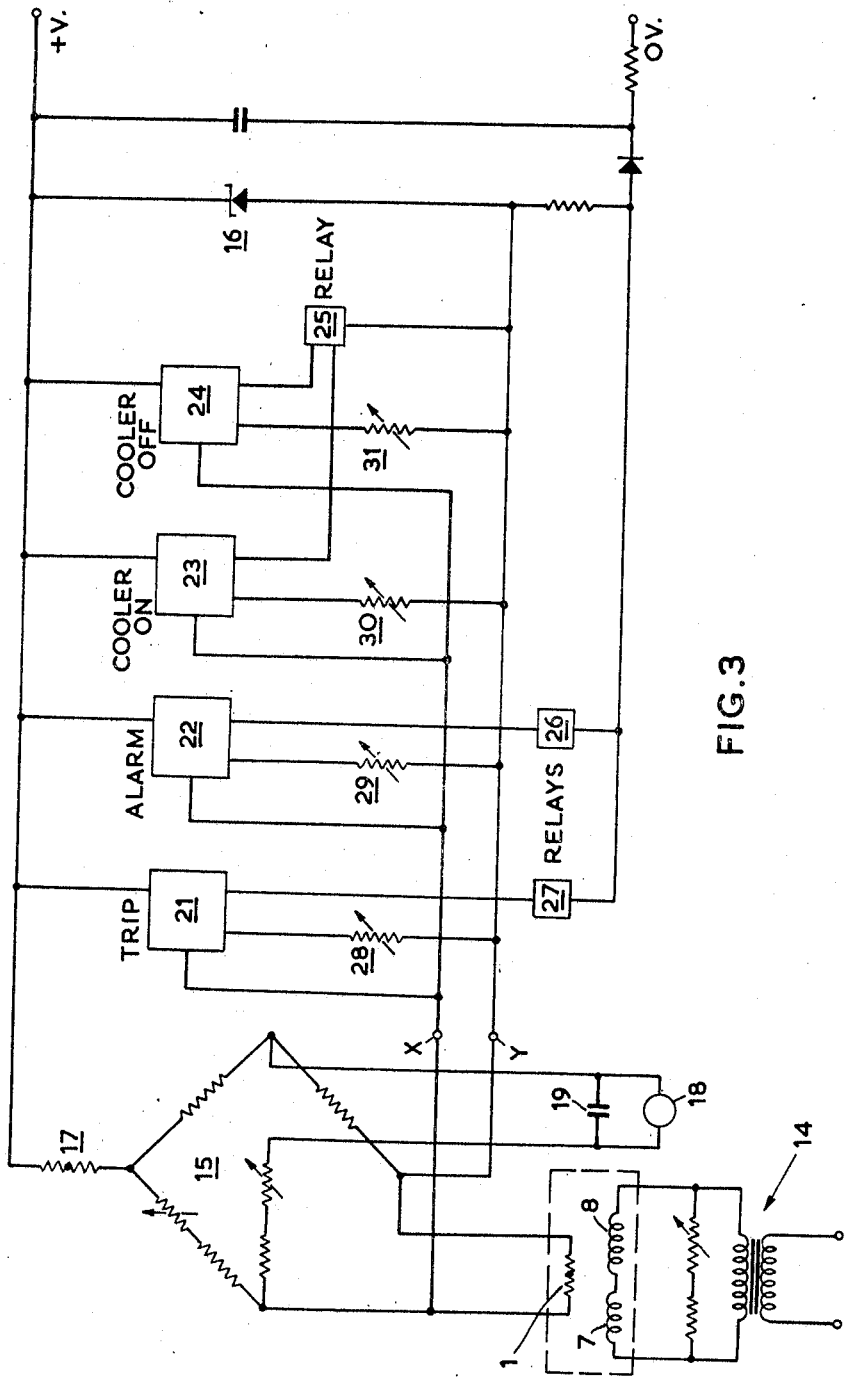
FIGURE 3 is a circuit diagram showing various control circuits actuated in response to various temperature attained by the sensing element.

Referring now to FIGURE 3, the heater windings 7 and 8 are supplied with a proportion of the transformer load current through a current transformer 14, and the silistor 1 is connected in one arm of a bridge network 15 having a voltage supply stabilised by a Zener diode 16 and a temperature compensating resistor 17 for this diode. Connected across the bridge as a detector is a milliameter 18 having a shunting capacitor 19 which renders this instrument insensitive to supreme signals. The milliameter current is a function of the resistance of the silistor which in turn is representative of the transformer winding temperature and accordingly the milliameter may conveniently be calibrated in terms of this temperature.

The voltage developed across the silistor is applied to terminals X, Y which are connected in common to the input circuits of transistor amplifiers 21–24. Each of these amplifiers performs various functions, namely, cooler control for the transformer, alarm and trip, by actuating associated relays 25, 26 and 27, and each includes a potentiometer 28–31, calibrated in temperature, for adjusting a bias level for the transistor amplifier which must be exceeded before its relay is actuated.

More particularly, the relay 25 is connected in common to the output circuits of the two amplifiers 23 and 24 which respectively govern the temperatures at which the transformer cooling means, e.g. a fan, is switched-on and switched-off. The amplifier 23 (cooler "on") controls the point at which the relay 25 picks up and the amplifier 24 (cooler "off") controls the point at which the relay 25 drops off. In this connection, the latter amplifier is saturated when the cooler "off" limit is traversed upon the temperature increasing and supplies at least half the pick-up ampere-turns of the relay 25, that is at least half the current needed to provide sufficient magnetisation to close the relay; thus, under these conditions there is no further increase in current through the amplifier 24 upon the relay subsequently picking up when the amplifier 23 is switched-on. Conversely, when the temperature is falling, the current through the amplifier 23 reduces to zero before the amplifier 24 is de-saturated and then the current through amplifier 24 falls to a value insufficient to maintain the holding current needed to keep relay 25 closed. The cooler-on and cooler-off controls are therefore independent of one another, provided that the temperature differential between pick-up and drop-off is great enough, e.g. 15° C., otherwise there is a possibility of, for example, amplifier 24 being de-saturated in response to a fall in temperature before the current through 23 has reduced to zero in which case the drop-off of relay 25 would be determined by the latter amplifier and this would unfavourably affect the calibration.

The relay 26 is connected to the output circuit of the amplifier 22 and operates an alarm should the winding temperature exceed the setting on potentiometer 29, and finally the relay 27 is connected to the output circuit of the amplifier 21 which operates a trip circuit to protect the transformer should the winding temperature increase even further and exceed the setting on potentiometer 28.

Figure 4:
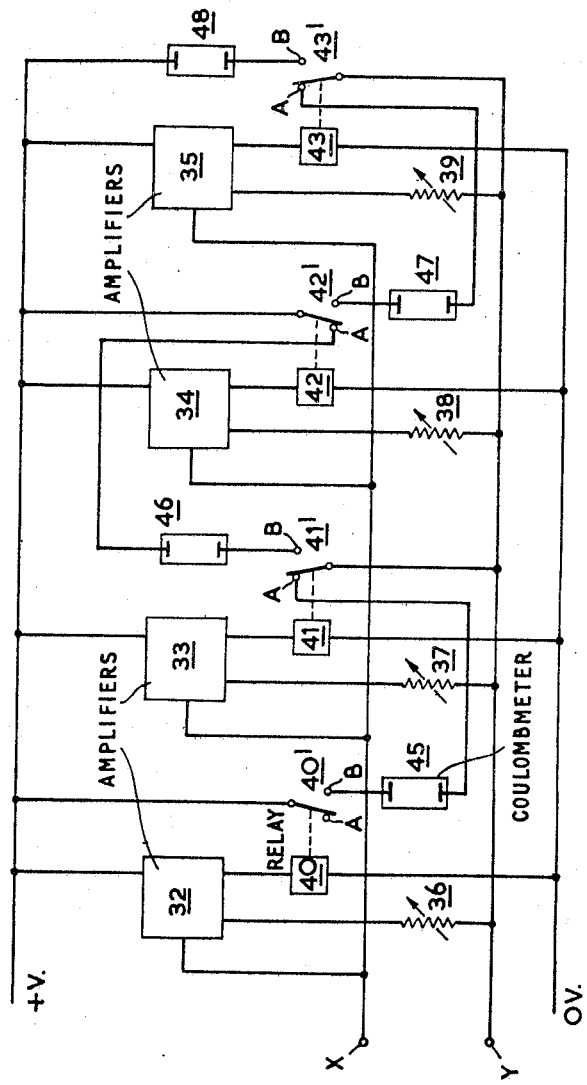
FIGURE 4 is a circuit diagram of a circuit adapted to indicate the times during which the sensing element, and thus the monitored apparatus, has been in various contiguous temperature bands.

Referring now to FIGURE 4 there is shown a circuit which is operated in dependence on the silistor voltage and provides an indication of the times for which the transformer windings have been in certain temperature bands.

The circuit shown is similar to that described in so far as it includes four transistor amplifiers 32–35 which receive their inputs from the terminals X, Y in FIGURE 3 and includes bias level potentiometers 36–39, respectively. In addition, four reed relays 40–43 are respectively connected in the output circuits of these amplifiers 32–35.

The relays 40–43 (shown de-energised) are operable to actuate contacts 40'–43', respectively, which are connected to a supply line and each change-over between contacts A and B, coulombmeters 45–48 being connected to the contacts B associated with these relays 40–43.

The potentiometers 36–39 are adjusted so that the amplifiers operate to actuate the contacts 40'–43' at various increasing temperature values, and it will be seen that as each temperature value is attained a coulombmeter is connected to the supply line so that a constant current is passed through it, accordingly, its reading gives a measure of time. As each temperature level is attained a particular coulombmeter is switched into circuit whilst the preceding coulombmeter is disconnected, so that only one coulombmeter is registering at any one time, and the value of current passing through each meter may conveniently be adjusted so as to govern the total time over which registration may be effected.

I claim:
1. A device for determining the temperature of electrical apparatus, comprising
   a source of electrical supply,
   an electrically conductive temperature-sensitive element connected to the supply source,
   two electrical heater coils, one of which is spaced from but wound closely around the said element and the other, larger, coil being wound about and spaced from both the said one coil and the said element, the disposition of the heater coils relative to the said element being such that the temperature-time characteristic of the said element matches that of the said apparatus, and
   circuit means operable in dependence on the voltage developed across the element for determining the temperature of said apparatus.
2. A device according to claim 1, comprising
   a tubular member within which the element is encapsulated, the member carrying the said one coil, and
   a synthetic resin block in which the said member together with the said one coil are encapsulated, the said other coil being wound around this block.
3. A device according to claim 2, comprising
   a sealed housing within which the said resin block is itself disposed.
4. A device according to claim 1, wherein the circuit means comprises
   a multi-arm bridge network, and
   connecting means for connecting the said element in one of the arms of said network.
5. A device according to claim 4, comprising,
   a balance detector connected in said bridge network for providing an indication of the temperature of said apparatus in dependence on the degree of bridge unbalance.
6. A device according to claim 5, comprising
   sensing means for monitoring the voltage across the element, and
   control means operable in response to said voltage to effect a plurality of different functions in dependence on the magnitude of said voltage.
7. A device according to claim 6, wherein the said functions are sequentially cooling the apparatus, providing an alarm indication, and tripping-out the supply to the apparatus.
8. A device according to claim 6, wherein the functions are effective to record the periods for which the magnitude of the said voltage across the element lies within certain ranges, whereby to provide a record of the periods for which the temperature of the apparatus has been within certain temperature ranges.
9. A device for determining the temperature of electrical apparatus comprising,
   a multi-arm electrical bridge network,
   an electrically conductive temperature-sensing element connected in one arm of the network,
   a plurality of electrical heater coils co-axially mounted in close proximity to said element and connected to conduct current proportional to that conducted by said apparatus, said heater coils being so disposed relatively to the element as to cause the temperature-time characteristic curve of the element to match that of the apparaus, and
   a balance detector connected across said bridge network for providing an indication of the temperature of said apparatus in dependence on the degree of bridge unbalance.

References Cited

UNITED STATES PATENTS

| | | | |
|---|---|---|---|
| 2,491,798 | 12/1949 | Camilli | 73—350 |
| 2,682,173 | 6/1954 | Camilli | 73—362 |
| 3,177,719 | 4/1965 | Pitts | 73—362 |

LOUIS R. PRINCE, Primary Examiner

DENIS E. CORR, Assistant Examiner

U.S. Cl. X.R.

73—350